Dec. 8, 1925.

H. A. BALLARD 1,564,927

IRRIGATION REGULATOR

Original Filed Dec. 21, 1922　　4 Sheets-Sheet 1

WITNESSES

HOWARD A. BALLARD, Inventor

Dec. 8, 1925.
H. A. BALLARD
IRRIGATION REGULATOR
Original Filed Dec. 21, 1922   4 Sheets-Sheet 2
1,564,927
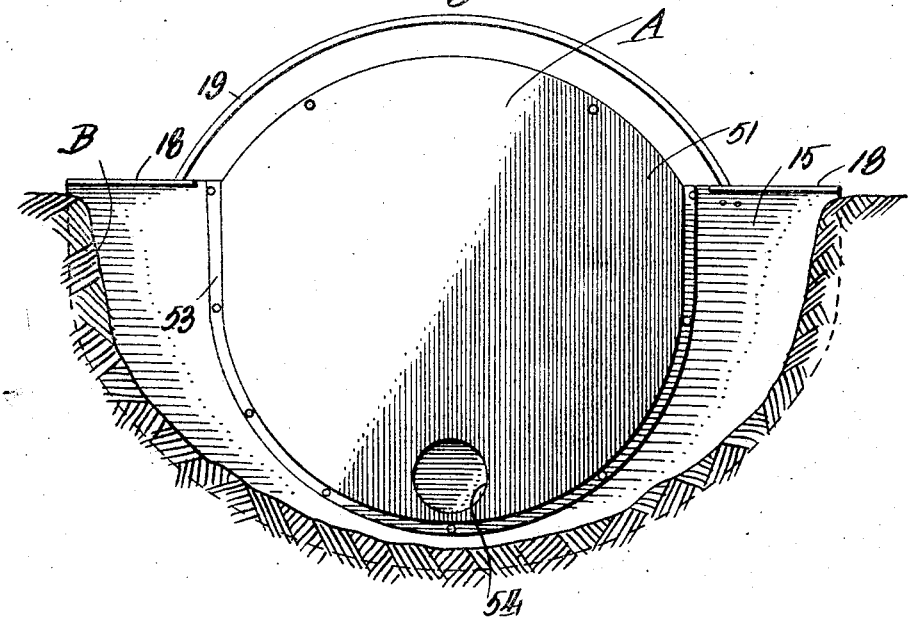
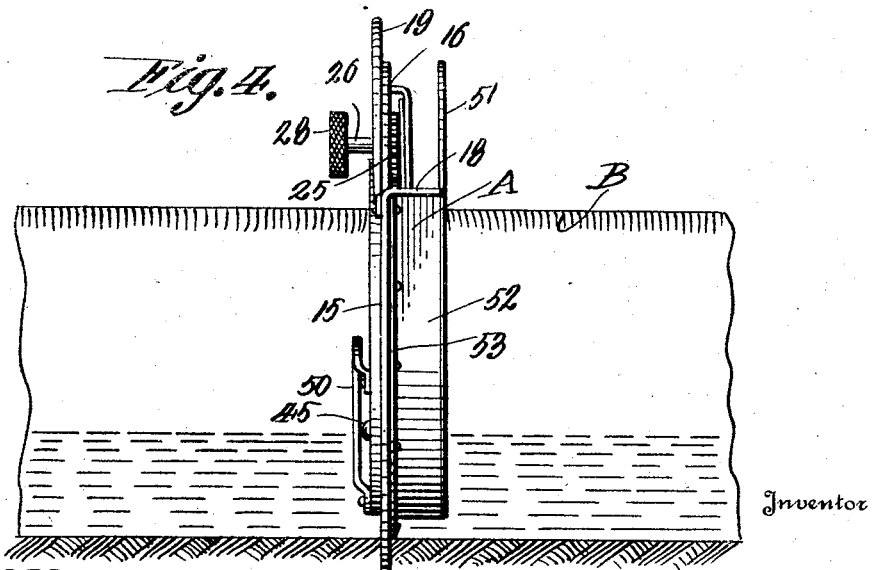
WITNESSES
Inventor
HOWARD A. BALLARD
By
Attorney Dec. 8, 1925.
H. A. BALLARD
IRRIGATION REGULATOR
Original Filed Dec. 21, 1922    4 Sheets-Sheet 3
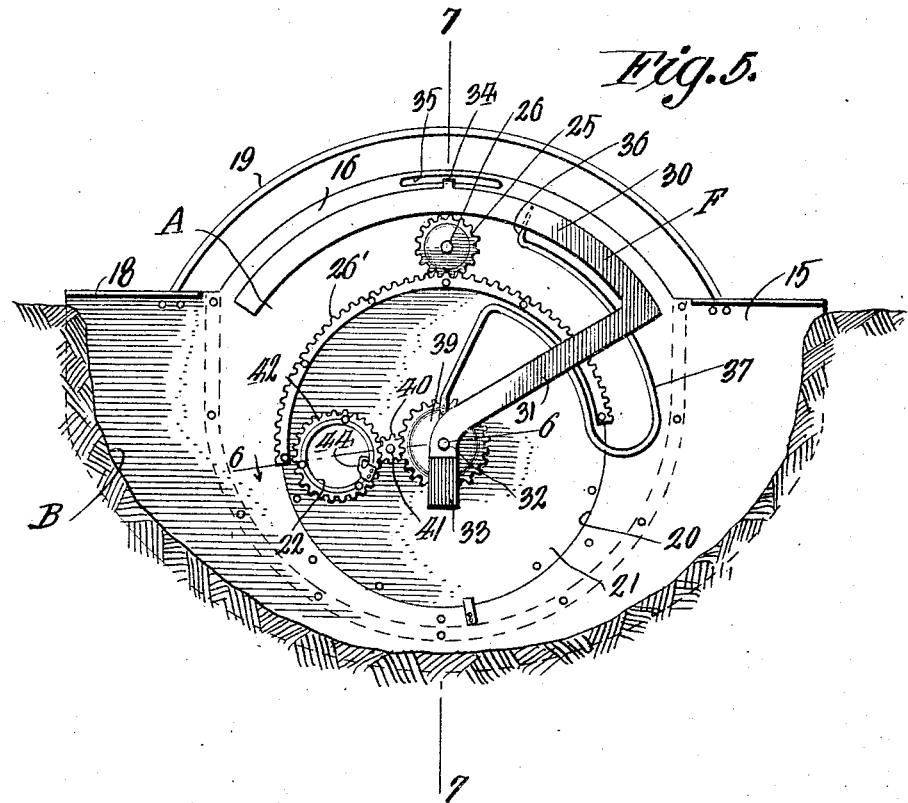
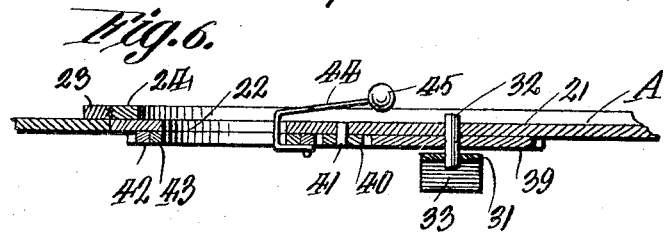
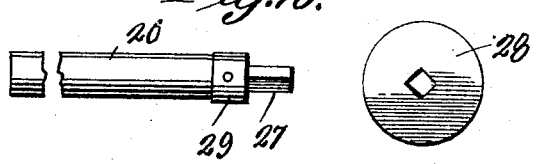
WITNESSES
HOWARD A. BALLARD

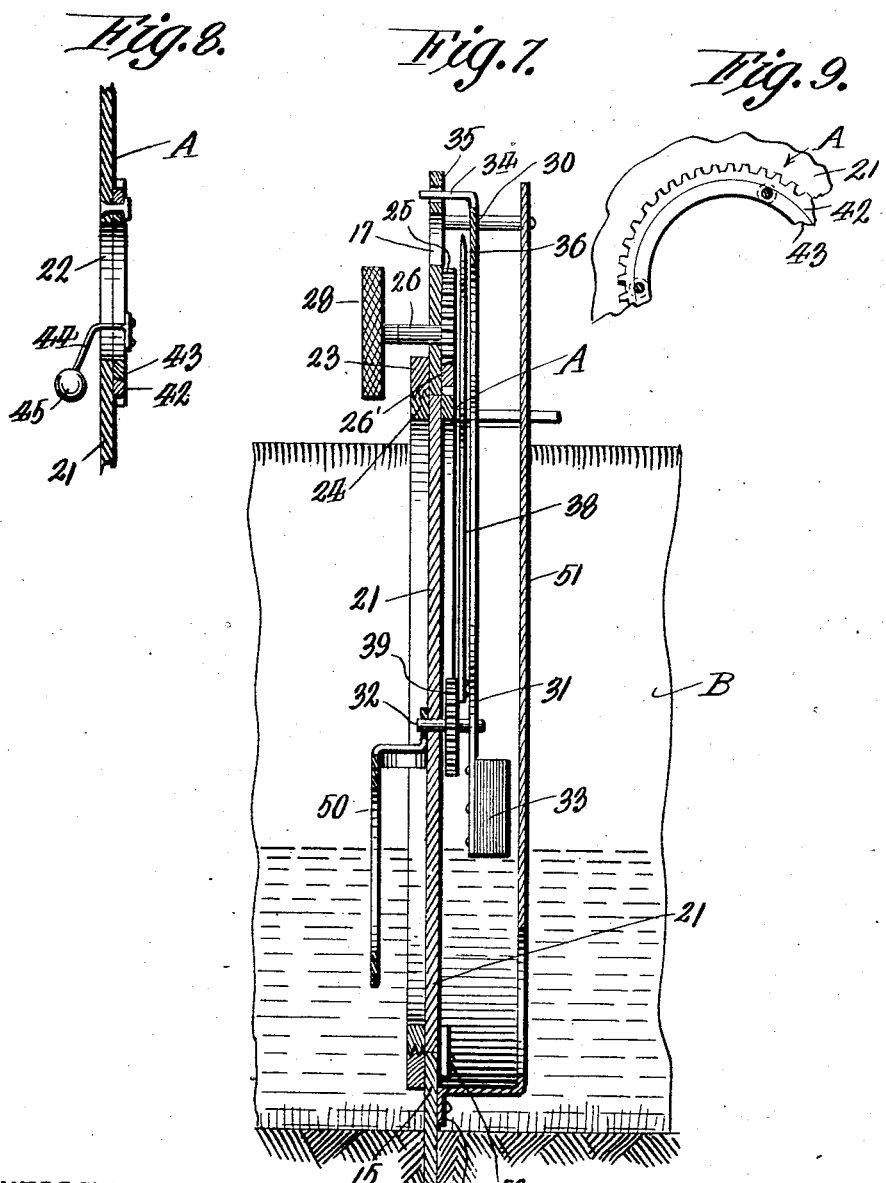

Patented Dec. 8, 1925.

1,564,927

UNITED STATES PATENT OFFICE.

HOWARD A. BALLARD, OF SACRAMENTO, CALIFORNIA.

IRRIGATION REGULATOR.

Application filed December 21, 1922, Serial No. 608,279. Renewed September 18, 1925.

*To all whom it may concern:*

Be it known that I, HOWARD A. BALLARD, a citizen of the United States, residing at Sacramento, in the county of Sacramento and State of California, and whose post-office address is 823 Seventh Street, Sacramento, California, have invented certain new and useful Improvements in an Irrigation Regulator, of which the following is a specification.

This invention relates to irrigation and the primary object of the invention is to provide a novel device for each irrigation ditch, for effectively controlling the amount of water entering the same, the devices being so constructed that an equal amount of water is insured for all of the ditches, thereby resulting in the even and thorough irrigation of the fields.

In the system of sub-irrigation, in which water is allowed to run in small open furrows and seep through the soil between the rows of the crop, there are certain essential rules which are generally followed to obtain the best results.

The length of time, that water is allowed to remain in the furrows, may vary from a few hours to many days, depending on the water requirements of the crop, porosity of the soil, its slope and other factors. It is generally conceded, however, that a small stream of water should run in the furrow for a long time, the longer, the water is in the furrow the farther it will seep through the soil. A large head of water in the furrow is dangerous, as a full head in the soft soil of the newly made furrow is hard to hold and will probably break away. This would make irrigation very difficult for the entire season. The amount of water and the length of time should suit the requirements of the particular field, and be just enough to seep across the row and clear through to the end of the furrow.

In irrigating a field, the irrigator is continually confronted with the problem of setting the water. That is of so dividing and regulating it that each small furrow may receive as near as possible an equal amount of water.

There is at present no standardized method of regulating irrigating water. Each individual irrigator has a method of his own, which usually involves a great deal of time and labor. Water is now regulated in the soft soil of the furrow with a shovel or hoe and it is impossible to regulate water permanently in this way. No two furrows in a field are exactly the same size or shape or exactly the same level or elevation. After the water enters the furrows, the size, shape and elevation of each furrow is continually changed by the action of the water, as it abrades the soil or washes sediment into the furrow. It is obvious that any change in the size, shape or elevation of the openings through which the water enters the furrow, will result in a like change in the amount of water delivered to the furrow through the opening. This continual change in the size, shape and elevation of the opening in the furrow is the direct cause for the difficulty experienced in regulating water by this method.

In practice, the irrigator regulates his water during the day, constantly changing the amount of water in the furrow by digging away the soil or filling in with weeds or other material which may be at hand.

The methods now followed of course result in the uneven irrigation of the soil and often one part of the field will be through before another part is through. It is of course advantageous to have all of the furrows through at one time, so that the head of water can be changed to another setting where this process of regulation is repeated.

To approach as near as possible to the ideal, each furrow should receive the same amount of water continuously for the same length of time, involving a minimum amount of time and labor with no loss of water.

It is therefore another prime object of this invention to provide an independent regulator for each ditch, which can be readily placed in position and removed when desired for another setting, and which is so arranged that the same amount of water can be supplied to each ditch irrespective of the peculiarities thereof.

A further object of the invention is to provide a gate or regulator for irrigation ditches embodying a body adapted to be placed across the ditch, means carried by the body for regulating the amount of water passing to the ditch and means for indicating the amount of water passing through the ditch.

A still further object of the invention is to provide an improved regulator or gate for each irrigation ditch of the above character, which will be durable and efficient in use, one which will be simple and easy to manufacture, and one which can be placed upon the market at a reasonable cost.

With these and other objects in view the invention consists in the novel construction, arrangement and formation of parts, as will be hereinafter more specifically described, claimed and illustrated in the accompanying drawings, forming a part of this specification, in which drawings:

Figure 3 is a rear elevation of the same, showing the position thereof in a ditch.

Figure 4 is an edge elevation of the improved regulator showing the same in position in a ditch.

Figure 5 is a rear elevation of the improved regulator with the cover for the operating gears removed, to fully disclose the operation thereof.

Figure 6 is an enlarged detail section taken on the line 6—6 of Figure 5.

Figure 7 is a vertical central section through the improved regulator taken on the line 7—7 of Figure 5.

Figure 8 is an enlarged detail section through the rotatable disk portion of the regulator showing the outlet opening therein and the means mounted around the opening for indicating the amount of water flowing therethrough.

Figure 9 is a detail fragmentary elevation of the rotatable disk of the regulator showing the outlet opening therein and the gear wheel mounted around the opening for operating the indicating pointer for showing the amount of water flowing through the openings.

Figure 10 shows detail views of the handle and operating shaft for rotating the rotatable disk.

Referring to the drawings in detail, wherein similar reference characters designate corresponding parts throughout the several views, the letter A generally indicates the improved regulator for governing the amount of water passing into the ditches B of a sub-irrigation system C.

Figure 1:
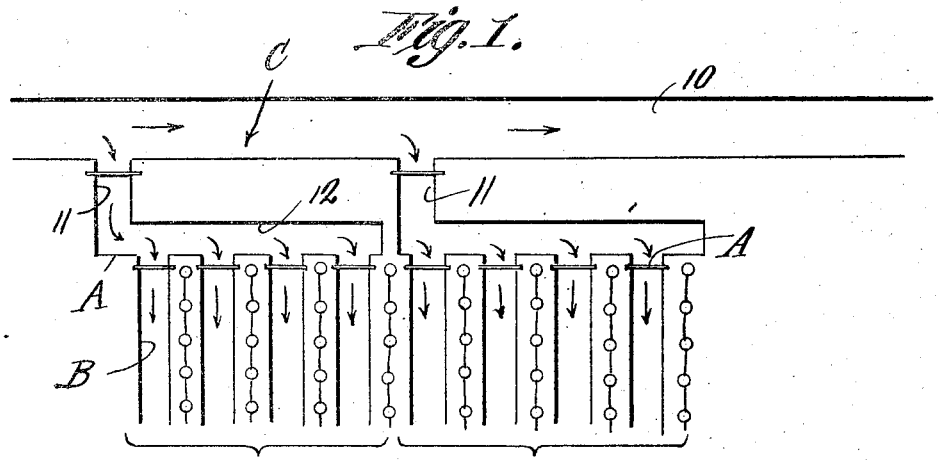
Figure 1 is a diagrammatic plan view showing the method used in sub-irrigation.

As clearly shown in Figure 1 of the drawings the sub-irrigation system C includes the main channel 10 through which the head of water flows. This channel 10 can be in the nature of a small canal or a large conduit pipe. The channel has communicating therewith at spaced points feeders 11, which communicate with the take-off ditches 12 which in turn communicate with the furrows or small irrigating ditches B. There may be as many ditches or furrows B for each take-off ditch 12 as desired. That is the take-off ditches can be arranged at any desired interval according to the nature of the soil and the crop being grown upon the soil. It is obvious that unless some dependable means is provided for each ditch or furrow B that an uneven irrigation of the field is bound to result.

Figure 2:
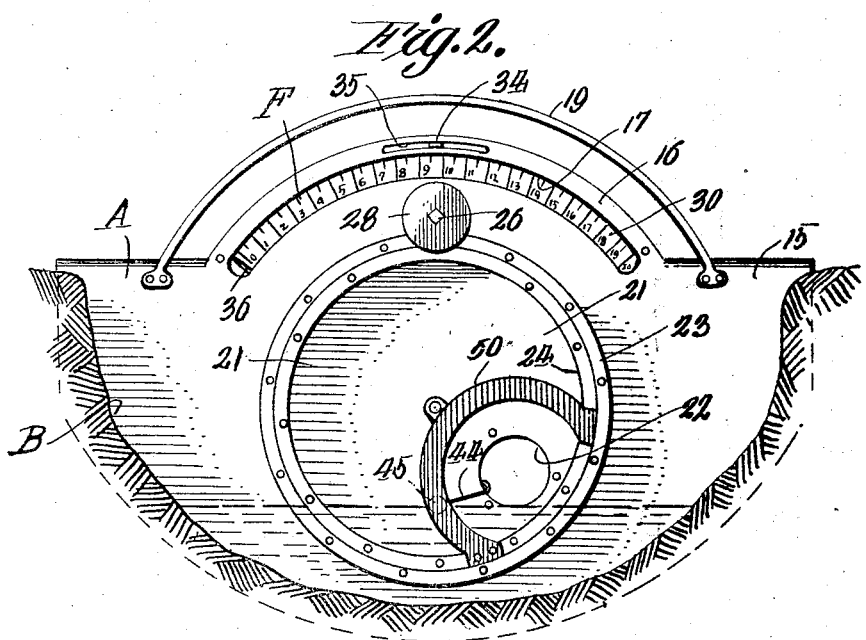
Figure 2 is a front elevation of the improved regulator showing the same disposed in an irrigating ditch.

The improved regulator A constituting the subject matter of this invention is peculiarly adapted for controlling the flow of the water to the ditches and is so arranged and constructed that an even quantity of water for each ditch is provided. Each regulator or gate A comprises a flat body 15 which is adapted to extend transversely of the ditch as clearly shown in Figures 2, 3 and 5 of the drawings. The body 15 can be constructed of any preferred material, but in view of the fact that the regulators are adapted to be moved from one set of ditches to another, it is desired to form the body of some light material such as sheet metal suitably galvanized or otherwise treated to prevent rusting. This body 15 is of a substantial semi-circular configuration and its lower edge or curved face can be sharpened if so desired to provide an inserting blade. This body 15 is adapted to be forced into the ground in any preferred manner, but in view of the fact that the ground around the ditches is usually relatively soft owing to the flow of water thereover, the inserting of the bodies 15 is a comparatively easy matter. The central portion of each plate or body 15 is provided with an arcuate extension 16 provided with an arcuate slot 17, the purpose of which will be hereinafter more fully described. The upper edge of the body or plate 15 on each side of the arcuate extension 16 is provided with a right-angularly extending flange 18 which provides a broad surface or handle for facilitating the inserting of the plate or body 15 in position across a ditch or furrow. A bail handle 19 is provided for the body 15 to facilitate the carrying of the regulators.

As clearly shown in the drawings each plate or body 15 is provided with an enlarged centrally disposed opening 20 covered by a rotatable disk 21 having a centrally disposed opening or water-way 22 therein. This disk 21 can be mounted on the plate or body 15 in any preferred way, just so the disk is free to rotate and so that a water tight joint will be had. By way of example the disk 21 has been shown mounted in possition in the following manner. An internally threaded ring 23 is secured around the opening 20 in any preferred manner, such as by rivets solder or the like. A second externally threaded ring 24 is secured to the disk 21 adjacent to the periphery thereof and is mounted within the disk 23. The rings 24 can be secured to the disk 21 in any preferred manner such as by rivets or solder and it is obvious by this construction that the disk can be rotated a portion of a revolution around the plate 15.

The opening or way 22 constitutes the means for permitting the water to flow from the take-off ditches 12 into the irrigating ditches or furrows B and it can be seen that by rotating the disk 21 that the opening 22 can be moved toward or away from the bottom of the ditch, thus forming means for regulating the quantity of water flowing into the ditch. This disk 21 can be rotated in any preferred manner, such as by a pinion 25 meshing with a sector rack 26 secured to the disk 21 adjacent to the periphery thereof. In view of the fact, that in actual practice the way 22 will only have to be moved a limited distance, the disk 21 will only have to be rotated a portion of a revolution. This pinion 25 is keyed or otherwise secured to a suitable rotatable shaft 26 mounted in a suitable bearing opening formed in the body or plate 15 adjacent to the vertical center thereof. One end of the shaft 26 is provided with a polygonal extension 27 which is adapted to receive a knurled operating handle 28 by means of which the pinion can be readily rotated and thus bring about the movement of the disk 21. In view of the fact that the shaft 26 could be rotated easier from the side of the ditch the shaft 26 can be provided with a collar 29 for the reception of an elongated operating handle or lever (not shown).

The primary reason for adjusting the way 22 away or toward the bottom of the ditch is to permit the same flow of water to take place in each ditch and thus if one ditch is at a higher elevation than another ditch, the way 22 can be moved toward or away from the bottom of the ditch as may be desired.

Now in order to determine the amount of water flowing through the way 22, so that the way 22 can be moved toward or away from out of the ditch as desired, the indicating means F has been provided.

This indicating means F includes an arcuate scale plate 30 which is adapted to appear in rear of the arcuate slot 17 heretofore mentioned. Now this scale plate 30 can be suitably marked to indicate the amount of water passing through the way 22. It is to be understood at this point that by the amount of water passing through the way 22 I mean the height of the water passing through the opening, that is whether the water arises a great or small distance above the lower edge of the way. The marking of the scale plate 30 is purely an arbitrary marking and can be changed when so desired. At one end the arcuate scale plate 30 is provided with an inwardly extending radially disposed arm 31 which is rotatably mounted upon an axially disposed shaft 32 carried by the center of the disk 21. The arm 31 is extended beyond the opposite side of the shaft 32 and is provided with a counter-balancing weight 33. The function of the weight 33 is to normally hold the scale plate 30 in a predetermined position irrespective of the fact whether the body or plate 15 is placed in the ditch at an angle or not. In order to limit the swinging movement of the scale plate 30 however the same is provided with a bumper tongue 34 which is slidably mounted in a slot 35 formed in the arcuate extension 16 above the opening 17. It is obvious that the length of the slot 35 limits the swinging movement of the scale plate 30.

A co-operating indicator 36 is provided for the scale plate 30 and is adapted to move over the scale plate. This indicator or pointer 36 is mounted upon one end of a U-shaped indicating rod 37, the opposite end of which terminates in an inwardly extending extension 38. The inner end of the arm 38 is riveted or otherwise secured to a pinion 39, that is rotatably mounted upon the axially disposed shaft 32. This pinion 38 has meshing therewith a relatively small pinion or idle gear wheel 40 that is mounted for free rotation on a short stub shaft 41 secured in any preferred manner to the disk 21. This idle gear wheel 40 in turn meshes with a ring gear 42 having the same diameter as the pinion 39. This ring gear 42 is rotatably carried by a guide ring 43, which is in turn secured in any preferred way to the disk 21 about the way or opening 22. A rigid float arm 44 is secured at the desired point upon the ring gear 42 and has mounted upon its end a float 45. When this float is in a pendant position and is not supported by water it is obvious that the indicator or pointer 36 will be at zero on the scale plate 30.

When water extends half way of the way or opening 22 the pointer 36 will be at a point equidistant to the ends of the scale plate or at the point marked 10 on the scale. When the water rises to the top of the way the pointer will be at the end of the scale or at the point marked 20 thereon. It is obvious that if the water continues to rise above the way that the scale will not indicate such condition. The operator of the improved gate or regulator can readily familiarize himself with the markings on the scale and thus be able to instantly determine the height of the water relative to the opening by the markings on the scale.

If so desired suitable guards can be provided for the various operating parts of the device and as shown I have provided an arcuate guide 50 for the float 44. This arcuate guide 50 is secured in any preferred manner to the rotatable disk 21.

In order to provide a guard for the gears 42, 40, 39, and the indicator 36 and the scale plate 30 I have provided a guard plate 51 which is disposed in spaced relation to the body plate 15. This guard plate 51 includes inwardly extending flanges 52 having attaching flanges 53 formed thereon which can be riveted or otherwise secured to the body or plate 15. The lower end of this guard plate 51 is provided with a suitable outlet opening 54.

In use, the improved regulators are placed transversely of the ditches B as clearly shown in the drawings and the handles 28 are rotated until the amount of water passing through the openings or ways 20 in all of the regulators is the same irrespective of the height or elevation of the ditches in relation to one another. Prior to the operation of the disk 21 the desired amount of water can be let into the take-out ditches 12 from the main channel C, after which the ways 22 can be adjusted to permit the desired amount of water to run into each ditch. It is obvious from the foregoing that the improved regulators permit an even amount of water to flow into each ditch irrespective of the position thereof.

Changes in details may be made without departing from the spirit or scope of this invention.

What I claim as new is:—

1. A regulator for irrigation ditches comprising a flat sheet metal body adapted to be placed transversely of the ditch, and a rotatable plate associated with the body having a water way therethrough.

2. A regulator for irrigation ditches comprising a sheet metal body adpated to be removably placed across an irrigation ditch, a rotatable plate associated with the body having a water-way therein, and means for operating said plate for raising and lowering said water-way.

3. A regulator for irrigation ditches comprising a body adapted to be placed transversely of an irrigation ditch, and having a water-way associated therewith, and float operated means carried by said member for indicating the height of the water passing through said way.

4. A regulator for irrigation ditches comprising a flat sheet metal body adapted to be placed transversely of an irrigation ditch, a plate rotatably associated with the body having a water-way therein, means for operating the plate to adjust the way toward or away from the lower end of the ditch, and float operated means associated with the plate for indicating the height of the water passing through said way.

5. A regulator for irrigation ditches comprising a flat sheet metal body having an arcuate lower edge adapted to be inserted in an irrigation ditch, said flat sheet metal body having an adjustable water-way associated therewith.

6. In a regulator for irrigation ditches, a flat sheet metal body having a water-way associated therewith, a ring gear rotatably mounted about the way, a float associated with said ring gear for rotating the same, a dial plate, and a pointer operated by said ring gear for movement over said dial plate.

7. In an irrigation ditch regulator, a sheet metal body adapted to extend transversely of the ditch having a water-way therethrough, an arcuate dial plate, means for centering the dial plate irrespective of the angular position of the plate in respect to the ditch, a pointer operable over said dial plate, and means for operating said pointer according to the height of the water passing through said way.

8. A regulator for irrigation ditches comprising a body adapted to extend transversely of an irrigation ditch, a movable plate associated with the body having a water-way therethrough, means for adjusting said plate, a ring gear rotatably carried by the plate mounted around said way, a float rigidly connected with said ring gear, a dial plate, a pointer movable over said dial plate, an axially disposed gear rotatably carried by the axial center of the plate, an idle gear operatively connecting the axially disposed gear with the ring gear, and means connecting the indicating pointer with the axially disposed gear.

9. In a regulator for irrigation ditches, a metal body adapted to be placed transversely of an irrigation ditch having an enlarged opening therein, a rotatable disk covering said opening having an eccentrically disposed water-way therein, a sector rack secured to said disk adjacent to the periphery thereof, a rotatable shaft carried by the body above said sector rack, a pinion secured to said shaft meshing with said sector rack, and an operating handle carried by said shaft.

10. A regulator for irrigation ditches comprising a flat sheet metal body adapted to extend transversely of an irrigation ditch having an arcuate inserting edge, an arcuate extension formed on the upper surface of the plate, right-angularly disposed flanges formed on the upper edge of said plate on each side of said arcuate extension, a movable plate associated with the first mentioned plate and having a water-way therethrough, and an arcuate bail handle secured to the upper edge of said first mentioned plate.

In testimony whereof I affix my signature.

HOWARD A. BALLARD.